No. 852,218. PATENTED APR. 30, 1907.
F. R. BUSSARD.
ROTARY ENGINE.
APPLICATION FILED JULY 7, 1906.

9 SHEETS—SHEET 1.

WITNESSES

INVENTOR
Felix R. Bussard
BY
ATTORNEYS

No. 852,218. PATENTED APR. 30, 1907.
F. R. BUSSARD.
ROTARY ENGINE.
APPLICATION FILED JULY 7, 1906.

3 SHEETS—SHEET 2.

WITNESSES

INVENTOR
Felix R. Bussard
BY
ATTORNEYS

UNITED STATES PATENT OFFICE.

FELIX R. BUSSARD, OF HAYS, KANSAS.

ROTARY ENGINE.

No. 852,218.      Specification of Letters Patent.      Patented April 30, 1907.

Application filed July 7, 1906. Serial No. 325,091.

*To all whom it may concern:*

Be it known that I, FELIX R. BUSSARD, a citizen of the United States, and a resident of Hays city, in the county of Ellis and State of Kansas, have invented a new and Improved Rotary Engine, of which the following is a full, clear, and exact description.

This invention relates to improvements in rotary engines, the object being to provide a rotary engine of simple construction, and that may be operated by an economical amount of steam, used expansively, or by direct pressure from the boiler.

I will describe a rotary engine, embodying my invention and then point out the novel features in the appended claims.

Reference is to be had to the accompanying drawings forming a part of this specification, in which similar characters of reference indicate corresponding parts in all the figures.

Figure 1:
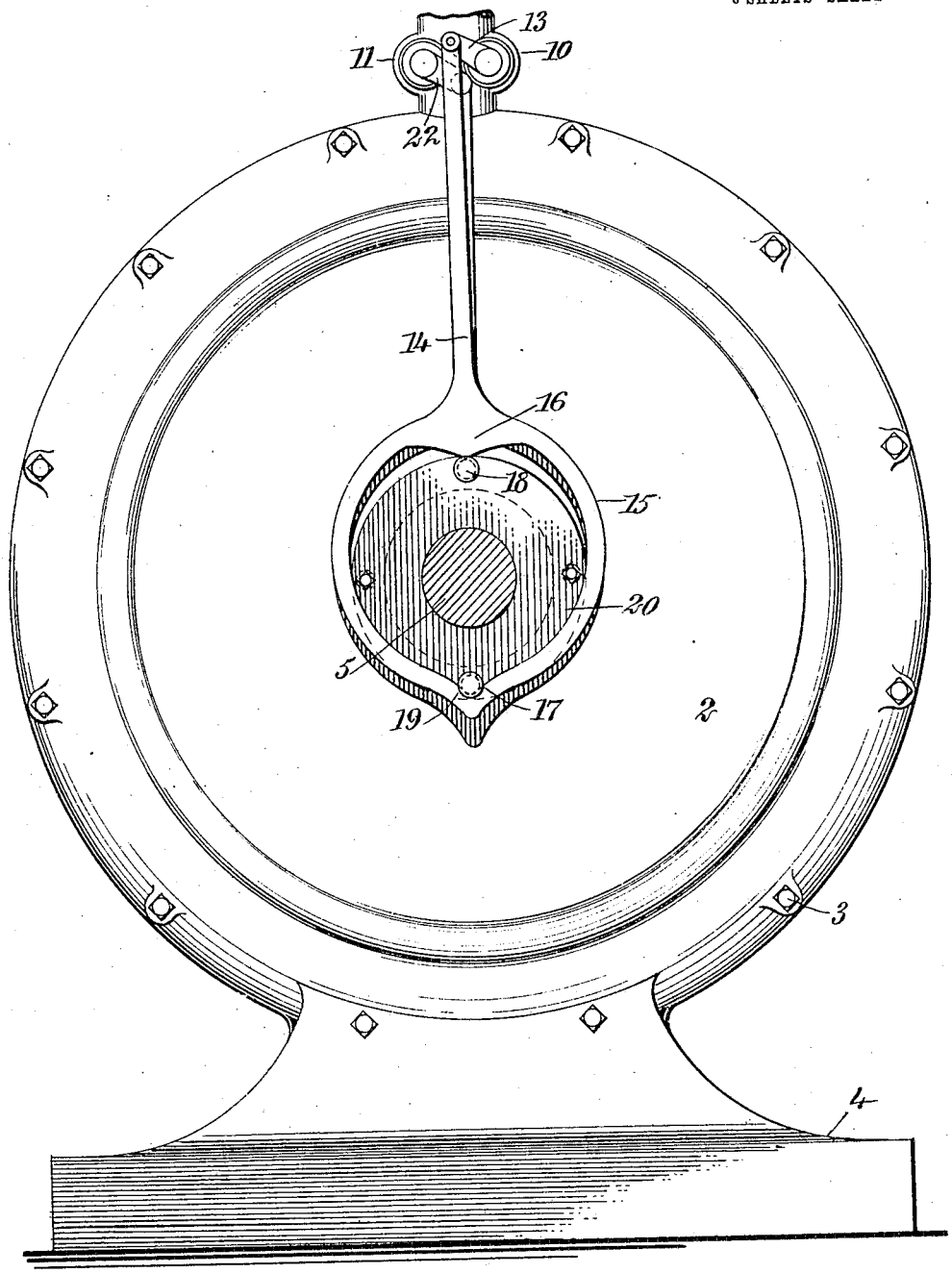
Figure 2:
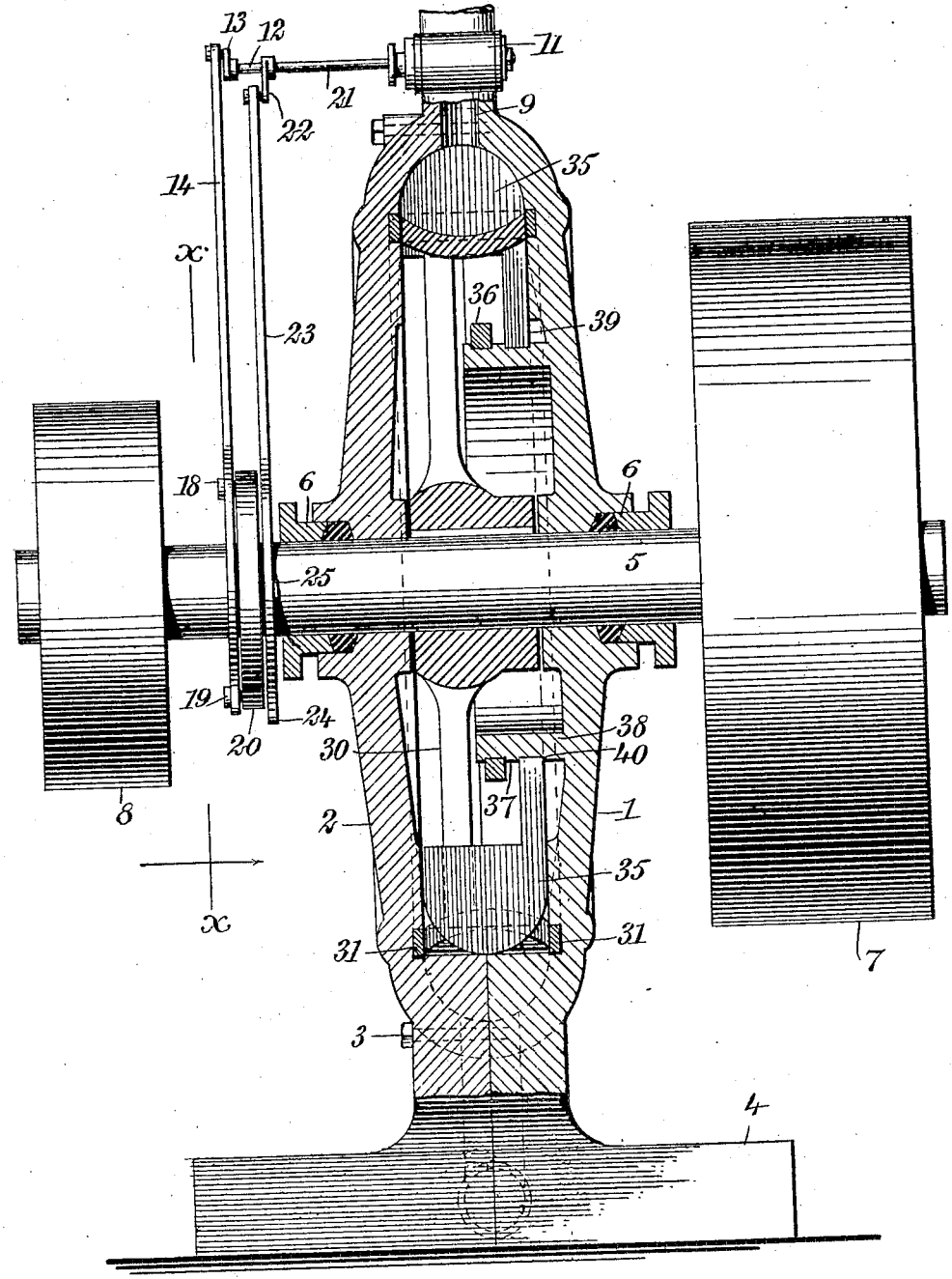
Figure 3:
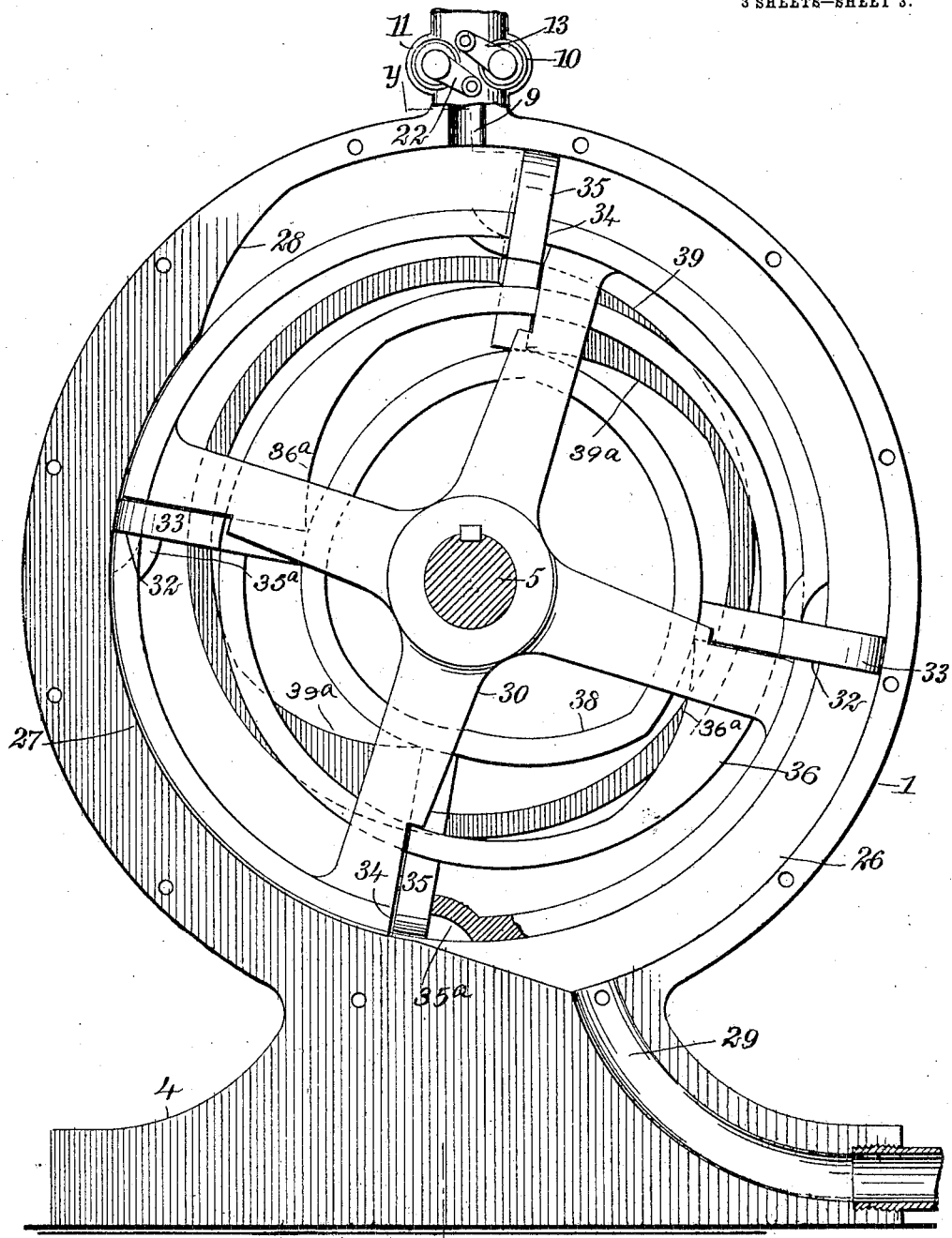

Figure 1 is a side elevation, partly in section on the line $x-x$ of Fig. 2, of a rotary engine embodying my invention; Fig. 2 is a section on the line $y-y$ of Fig. 3; and Fig. 3 is a central, vertical section.

The cylinder of the engine as here shown, consists of two sections 1, 2, and secured together by means of bolts 3, these sections being mounted on a base 4. Extended through the cylinder is a driving shaft 5 which has bearings in stuffing-boxes 6, and on this shaft is a fly-wheel 7 and a band-wheel 8. Motive agent is admitted to the cylinder through the port 9 which is controlled by valves arranged in casings 10, 11. The valve in the casing 10 has its stem 12 provided with a crank 13 to which an operating rod 14 is attached; the lower end of said rod 14 has a ring-shaped member 15, the inner side of which has at the upper portion, a downward extension or cam 16 and at the lower portion it has a cam depression 17. These cam surfaces are designed to be engaged by rollers 18, 19, carried by a disk 20 secured to the driving shaft 5, so that when said shaft rotates the valves will be thrown to open and closed positions alternately. The valve in the casing 11 has an outwardly extended stem 21 provided with a crank 22, attached to which is the upper end of an operating rod 23, and on the lower end of said rod is a ring 24 the interior of which is similar in shape to that of the ring 15, and is engaged by rollers 25 on said disk 20. The two pairs of rollers are so arranged on the disk 20 that the two valves will be alternately operated to admit and cut off steam.

Partly extending around the interior of the cylinder is the working chamber 26, and completing the circle at the opposite side from the chamber is a block 27 terminating at the upper end near the steam inlet in an abutment 28; and in the lower portion of the working or steam chamber 26 is an exhaust port 29.

Keyed to the driving shaft within the cylinder is a blade-carrying wheel 30, the rim of which engages against packing rings 31 seated in channels formed on the inner surface of the cylinder sections. The rim of the wheel 30 is provided with opposite openings 32 through which piston blades 33 are slidable, and the rim is also provided at right-angles to the first-named openings with opposite openings 34 in which piston blades 35 are slidable. At the pressure side of each blade the carrying wheel has a peripheral depression 35$^a$ which provides for an increase bearing surface or surface exposed to the pressure of the motive agent. The opposite blades 33 are connected by means of a ring 36 which has interior projections 36$^a$ engaging in a channel 37 formed in a cam-shaped casing 38 attached to the inner side of one of the cylinder sections, as clearly indicated in Fig. 2. The opposite blades 35 are attached one to the other, by means of a ring 39, having interior projections 39$^a$ engaging in a channel 40 formed in said cam casing 38. This cam casing corresponds in shape to the interior peripheral surface of the engine cylinder, and therefore, as the driving shaft rotates, there will be a constantly shifting center of the rings around the shaft which is determined by the cam and therefore the piston blades will be moved outward as they reach the working chamber 26, thus receiving the impact or expansion pressure of the steam. The enlarged projections at the inner side of the rings form solid bases for the blade shanks and cause the movements of the blades as the remaining interior diameter of each ring equals the exterior diameter of the casing 38.

The operation of the engine is quite obvious; that is, the steam admitted through the port 9 will act upon the blades extended outwardly into the working chamber 26, and upon reaching the port 29 the motive agent will exhaust.

Having thus described my invention I claim as new and desire to secure by Letters Patent:

1. A rotary engine, comprising a cylinder, a shaft extended through the cylinder, a wheel mounted on said shaft within the cylinder, and having two sets of opposite openings in its rim, the said cylinder having an interior working chamber extending partly around the cylinder, two pairs of connected blades, the blades of each pair being opposite and operating in the openings formed in the wheel rim, and a fixed cam for moving the blades inward and outward.

2. A rotary engine, comprising a cylinder having a block extended segmentally at its inner side and terminating at the top in an abutment, the space between the ends of said block forming a working chamber, a shaft extended through the cylinder, a wheel keyed to said shaft and having two pairs of opposite openings in its rim, two pairs of blades operating in said openings, the opposite blades of the pairs being connected, a cam shaft, a casing extended inward from one side of the cylinder, and having peripheral channels in which the inner ends of the blades engage, and means operated by the working shaft for controlling the inlet of motive agent.

3. A rotary engine, comprising a cylinder, a shaft extended through the cylinder, a wheel mounted on the shaft within the cylinder, the interior of said cylinder having a segmental block at one side and a working chamber extending from one end of said block to the other, a cam casing attached to the interior of the cylinder, and conforming in shape to the inner periphery of the cylinder, the rim of said wheel being provided with opposite openings, two pairs of piston blades movable through the openings, the blades of each pair being connected one with the other, and the inner ends of said blades engaging with said cam casing, a pair of valves for controlling the inlet of steam to the cylinder, cranks on the stems of said valves, rods extended downward from said cranks and having ring-like lower ends having interior cam surfaces, a disk mounted on the shaft, and rollers on opposite sides of said disk for engaging in the said ring-shaped ends of the rods, which are arranged at opposite sides of the disk.

4. In a rotary engine, a cylinder, a shaft extending through the cylinder, a wheel mounted on said shaft within the cylinder, the rim of said wheel being provided with openings, the said cylinder having a working chamber extending partly around the cylinder, piston blades operating in said openings, in the wheel rim, a fixed cam, and a ring connected with the piston blades and having interior projections engaging the fixed cam to move the blades inward and outward.

5. In a rotary engine, a cylinder consisting of two sections secured together and mounted on a base, a shaft extending through the cylinder, a wheel mounted on said shaft within the cylinder, the rim of the wheel being provided with openings, the said cylinder being provided with an inlet and an exhaust and having an interior working chamber, piston blades operating in the openings in the wheel rim and adapted to be moved outward into the said working chamber, a fixed cam connected with the inner face of one of the cylinder sections, and rings connected with the piston blades and having interior projections engaging said fixed cam to move the blades inward and outward, and means operated by the shaft of the engine for controlling the inlet of the motive agent.

6. A rotary engine comprising a cylinder, a shaft extending through the cylinder, a wheel mounted on said shaft within the cylinder and having two sets of opposite openings in its rim, the said cylinder having an interior working chamber extending partly around the cylinder, two pairs of piston blades, the blades of each pair being oppositely located and operating in the openings formed in the wheel rim, a ring connecting each pair of opposite blades, the rings having interior projections, and a fixed cam engaged by said projections on the rings for moving the blades inward and outward.

In testimony whereof I have signed my name to this specification in the presence of two subscribing witnesses.

FELIX R. BUSSARD.

Witnesses:
HENRY SCHWALLER,
FRED SCHWALLER.